Oct. 20, 1970 T. L. HUGHES 3,535,170
HIGH VOLTAGE n-p-n TRANSISTORS
Filed March 7, 1968
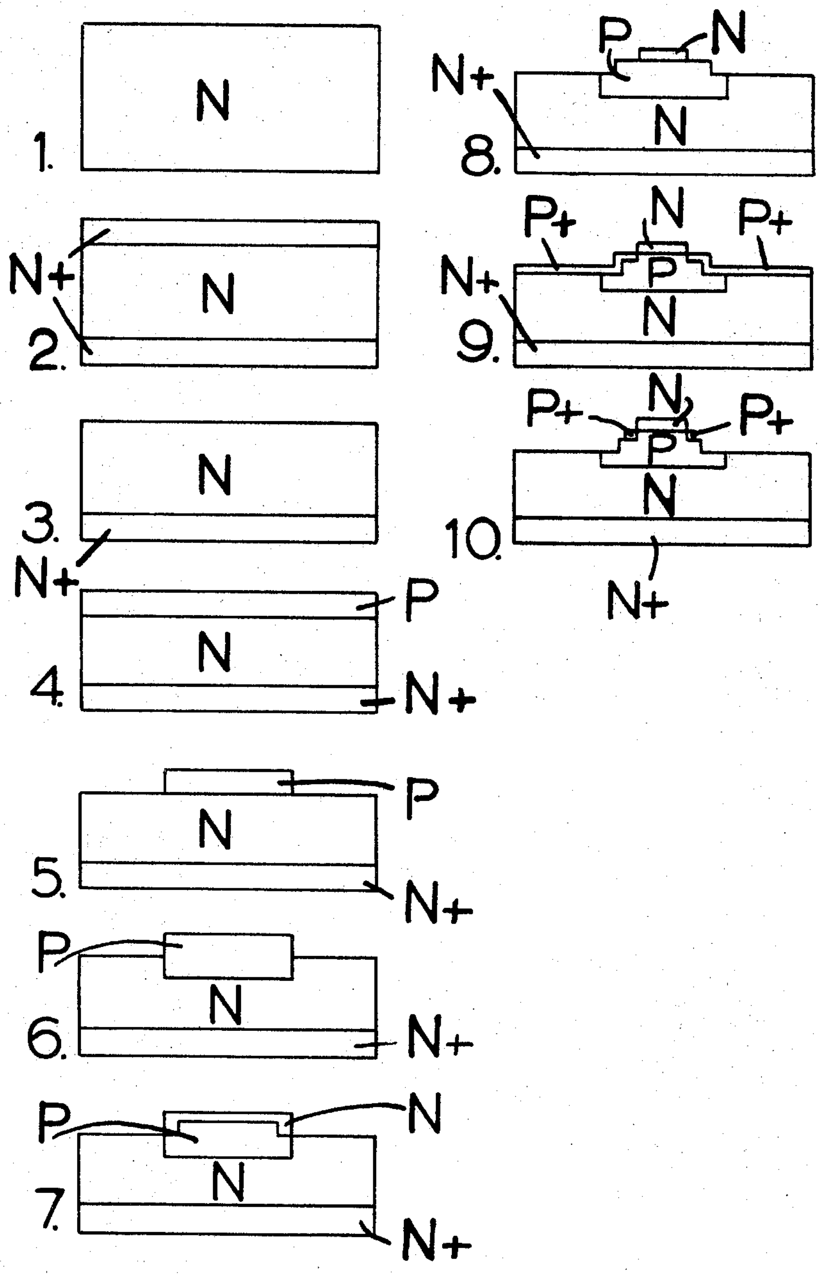
1. 2. 3. 4. 5. 6. 7. 8. 9. 10.
INVENTOR
T. L. Hughes
BY
ATTORNEYS

United States Patent Office 3,535,170
Patented Oct. 20, 1970

3,535,170

HIGH VOLTAGE n-p-n TRANSISTORS

Thomas Lawrence Hughes, Birmingham, England, assignor to Joseph Lucas (Industries) Limited, Birmingham, England Filed Mar. 7, 1968, Ser. No. 711,445
Claims priority, application Great Britain, Apr. 11, 1967, 16,542/67
Int. Cl. H01l 7/44
U.S. Cl. 148—190 1 Claim

ABSTRACT OF THE DISCLOSURE

In manufacturing a high voltage n-p-n transistor, aluminium is diffused into one face of an n-type slice, part of the aluminium layer is then removed to leave a p-type layer in the n-type layer. Diffusion of the aluminium is allowed to continue in an oxidizing atmosphere, after which an n-type impurity is diffused into said one face of the slice, at least that part of the resulting n-type layer bridging the collector-base junction being removed to leave in the base an n-type layer. A p-plus type impurity is then diffused into said one face except for said n-type emitter layer, the p-plus layer is removed from the collector layer on the collector-base junction, and finally contacts are made to the base, emitter and collector.

This invention relates to a method of manufacturing high voltage n-p-n transistors (i.e.) transistors which have a high collector-base breakdown voltage in the region of hundreds of volts.

A method according to the invention comprises the following steps:

(i) Diffusing aluminium into one face of an n-type silicon slice which is to act as the collector of the transistor, (ii) Removing part of the aluminium layer formed at stage (i) to leave a p-type layer which is to act as the base of the transistor.

(iii) Allowing diffusion of the aluminium to continue in an oxidising atmosphere at an elevated temperature to change the concentration profile of the aluminium in said p-type layer and so increase the collector-base breakdown voltage, (iv) Depositing an n-type impurity on said p-type layer, (v) Removing at least that part of the resultant n-type layer bridging the collector base junction, to leave in said base an n-type layer which in use is to act as the emitter of the transistor, (vi) Diffusing a p+ impurity into said one face of the slice except for said n-type emitter layer, (vii) Removing said p+ layer from the collector layer and the collector-base junction, (viii) Making contacts to the base, emitter and collector.

It will of course be appreciated that the method can, and in the preferred embodiments will, include further steps.

The invention further resides in a transistor formed by the method specified.

The accompanying drawing is a flow sheet illustrating one example of the invention, the various steps illustrated being numbered to accord with the stage numbers in the following description. The drawing is highly diagrammatic, and the various regions of the slice are not drawn to scale. Glass layers formed at various stages and then removed are not shown.

STAGE 1

A slice of n-type silicon having a resistivity of 25 ohm-cms. is cut 0.012 inch thick.

STAGE 2

The slice is placed in a furnace at 1300° C. and phosphorus is diffused into the slice for 10 minutes. The phosphorus source is then removed and the slice is left in the furnace at 1300° C. for 16 hours, after which the furnace is allowed to cool slowly. This stage produces highly concentrated n+ layers in the slice.

STAGE 3

The diffused n+ layer is removed from the top surface (as drawn) of the slice either by etching or lapping and polishing. The slice is now 0.0055 inch thick with an n+ layer 0.0027 inch thick on its lower surface. The n+ layer is highly concentrated, and is substantially unaffected by the remaining stages of the process, and so it will not be mentioned again.

STAGE 4

The slice is cleaned and aluminium is diffused into the slice without significant heating of the slice. For this purpose the slice is placed in the cold part of a furnace which is evacuated to a pressure less than $1.0 \times 10^{-4}$ mms. Hg. The slice and the source of aluminium are then moved to the central hot part of the furnace at 1100° C. for 30 minutes, after which the aluminium is moved to a cold part of the furnace so that the aluminium no longer vaporises. This stage produces a p-type layer in the upper surface of the slice. After a delay of 5 minutes, which ensures that the aluminium source has cooled sufficiently to take no further part in the process, air or other oxidising atmosphere is admitted to the furnace and diffusion is allowed to continue for 5 minutes, after which the slice is removed from the furnace.

STAGE 5

Part of the aluminium diffused layer is removed by conventional photomasking and etching techniques. The mask is removed and the glass layer on the silicon is removed with hydrofluoric acid. The slice now has an n-type region which is to act as the collector, and a p-type region in the n-type region which later becomes as the base.

STAGE 6

The slice is placed in a furnace at 1200° C. in an oxidising atmosphere for 8 hours, and then cooled slowly. The effect of diffusing the aluminium further into the slice in an oxidising atmosphere is to alter the concentration profile of the aluminium so that the greatest concentration of aluminium occurs below the surface, and the gradient is made considerably shallower at the collector-base junction. It is primarily the shallow gradient which gives the transistor to be made a high collector-base breakdown voltage.

STAGE 7

The glass produced at stage 6 is removed from the slice with hydrofluoric acid, and the slice is cleaned and placed in a furnace at 1200° C. Phosphorus is diffused into the slice from a source of phosphorus oxychloride for 5 minutes. The furnace is then purged with a suitable atmosphere for 5 minutes and the slice is withdrawn.

STAGE 8

Conventional photomasking and etching techniques are used to remove the n-type phosphorus layer from the upper surface of the slice except for a region on the p-type aluminium layer where the emitter of the transistor is required.

STAGE 9

The photoresist used at stage 8 is removed by a chromic acid dip at 95° C. and the slice is cleaned. The n-type phosphorus layer is masked, conveniently by ensuring that the glass formed at stage 8 over the phosphorus layer is not removed, and the slice is then placed in a furnace at 1050° C. Boron is diffused into the slice from a source of boron trichloride for 5 minutes, and the furnace is then purged with nitrogen for 10 minutes, after which the slice is removed.

STAGE 10

The p+ type layer formed at stage 9 is removed from the collector region and the collector-base junction by photomasking and etching, so that the p+ layer is present only on the base region.

STAGE 11 (not shown)

The photoresist used at stage 10 is removed and the slice is cleaned and placed in a quartz furnace tube through which wet oxygen is passed for 30 minutes with the furnace at 1200° C. The slice is then allowed to cool slowly. This stage allows the aluminium to diffuse further into the slice to thicken the base, the phosphorus to diffuse into the base to form the emitter, and the boron to diffuse into the base to form concentrated a p-type layer in the surface of the base.

STAGE 12 (not shown)

Contacts are made to the base, emitter and collector. These contacts can all be made to the upper surface.

Having thus described my invention what I claim as new and desire to secure by Letters Patent is:

1. A method of manufacturing a high voltage n-p-n transistor comprising the following steps:

(i) diffusing aluminium into one face of an n-type silicon slice which is to act as the collector of the transistor, (ii) removing part of the aluminium layer formed at stage (i) to leave a p-type layer which is to act as the base of the transistor, (iii) allowing diffusion of the aluminium to continue in an oxidising atmosphere at an elevated temperature to diffuse the aluminium further into the slice and to change the concentration profile of the aluminium in said p-type layer and so increase the collector-base breakdown voltage, (iv) diffusing an n-type impurity into said one face of the slice, (v) removing at least that part of the resultant n-type layer bridging the collector-base junction, to leave in said base an n-type layer which in use is to act as the emitter of the transistor.

(vi) diffusing a p+ impurity into said one face of the slice except for said n-type emitter layer.

(vii) removing said p+ layer from the collector layer and the collector-base junction.

(viii) making contacts to the base, emitter and collector.

References Cited

UNITED STATES PATENTS

| | | | |
|---|---|---|---|
| 3,210,225 | 10/1965 | Brixey | 148—190 |
| 3,249,831 | 5/1966 | New et al. | 148—190 |

L. DEWAYNE RUTLEDGE, Primary Examiner

R. A. LESTER, Assistant Examiner

U.S. Cl. X.R.

29—580; 148—186, 187